DEVICE FOR ADJUSTING POSITION OF STEREOPHONIC HEAD OF MAGNETIC SOUND RECORDER-REPRODUCER

Filed Dec. 27, 1966 5 Sheets-Sheet 1

Tsunehiro Tsukagoshi and
MASARU CHIJIIWA

INVENTORS

BY Wenderoth, Lind and Ponack, attorneys

Tsunehiro Tsukagoshi et al
MASARU CHIJIIWA

INVENTORS

BY Wenderoth, Lind and Ponack, Attorneys

Tsunehiro Tsukagoshi et al
MASARU CHIJIIWA

INVENTORS

BY Wenderoth, Lind and Ponack, Attorneys

Tsunehiro Tsukagoshi et al
MASARU CHIJIIWA
INVENTORS
BY Wenderoth, Lind and Ponack, attorneys Tsunehiro Tsukagoshi and
MASARU CHIJIIWA
INVENTORS
BY Wenderoth, Lind and Ponack, Attorneys 3,531,126
Patented Sept. 29, 1970

3,531,126

DEVICE FOR ADJUSTING POSITION OF STEREOPHONIC HEAD OF MAGNETIC SOUND RECORDER-REPRODUCER

Tsunehiro Tsukagoshi, Tokyo-to, and Masaru Chichiiwa, Tokorozawa-shi, Japan, assignors to Pioneer Kabushiki Kaisha, Ota-ku, Tokyo-to, Japan, a joint-stock company of Japan Filed Dec. 27, 1966, Ser. No. 604,821
Claims priority, application Japan, Dec. 29, 1965, 40/81,943; June 29, 1966, 41/42,504
Int. Cl. G11b *5/00*
U.S. Cl. 274—4 11 Claims

ABSTRACT OF THE DISCLOSURE

The magnetic head of a stereophonic tape recorder-reproducer is adjustably positioned by a cam mechanism controlled by an electrical circuit which is controlled by switches and contact means operated by mechanisms actuated by the cam mechanism, physical configurations of tape cartridges inserted, and an end mark on each tape to adjust the position of the magnetic head in accordance with the interchanging of cartridges of different numbers of tape tracks and with the selection of tracks of each tape for stereophonic operation.

This invention relates to magnetic sound recording and reproducing apparatuses and more particularly to such apparatus in which two tape cartridges of different numbers of tracks are selectively used.

More specifically, the invention concerns a new device for automatically or manually adjusting the position of the stereophonic magnetic head of an apparatus of the type referred to above in accordance with the interchanging of tape cartridges of different types and with the selection of tracks in each tape for stereophonic operation.

Tape cartridges having respective numbers of tracks whose ratio is an integer as, for example, 8 tracks and 4 tracks, are selectively usable in accordance with the present invention, the widths of the tapes enclosed in these tape cartridges being exactly the same for both 8 tracks and 4 tracks. Therefore, in the case where a single stereophonic recording and reproducing head is used, it is necessary to select the required number of tracks and adjust accordingly the position of the stereophonic head.

It is an object of the present invention to provide a mechanism for accurately and freely adjusting the position of a reproducing head for the purpose of conforming to the number of tracks of the tape to be used and, at the same time, selecting the required tracks from among the available tracks.

Another object of the invention is to provide a mechanism whereby two kinds of cartridges respectively containing recording tapes of track numbers with an integral number ratio relationship can be interchangeably and directly used, and whereby each of the cartridges can be readily used to reproduce stereophonic sounds.

Still another object of the invention is to provide means whereby, when a magnetic sound recording-reproducing apparatus is loaded with a desired cartridge, an electrical circuit conforming therewith is formed to adjust the recording-reproducing head automatically to the required position, and whereby, moreover, selection of the tracks of each cartridge is also made possible.

The foregoing objects, other objects, advantages, and novel features have been achieved by the present invention, according to which, briefly stated there is provided, in a magnetic sound recording and reproducing apparatus, a head position adjusting device comprising a head moving means, an electrical circuit for controlling the head moving means, and switches and contact means included in the circuit and operating in response to the operation of the head moving means, the type of cartridge (number of tracks), and an end mark on each tape to control the head position in accordance with the interchanging of cartridges and with the selection of tracks of each tape.

The nature, principle, utility, and details of the invention will be more clearly apparent from the following detailed description with respect to preferred embodiments of the invention, when read in conjunction with the accompanying drawings, in which like parts are designated by like reference numerals and characters.

In the drawings:

FIG. 7(*b*) is a similar plan view in the case when the cartridge has been removed;

FIG. 7(*c*) is a sectional view taken along the plane indicated by line VII—VII in FIG. 7(*b*) as viewed in the direction of the arrows showing the locked state of the lock mechanism shown in FIG. 7(*b*);

FIG. 8(*b*) is a sectional view taken along the plane indicated by line VIII—VIII in FIG. 8(*a*) as viewed in the direction of the arrows in the case when the lock mechanism is not operative;

Figure 6:
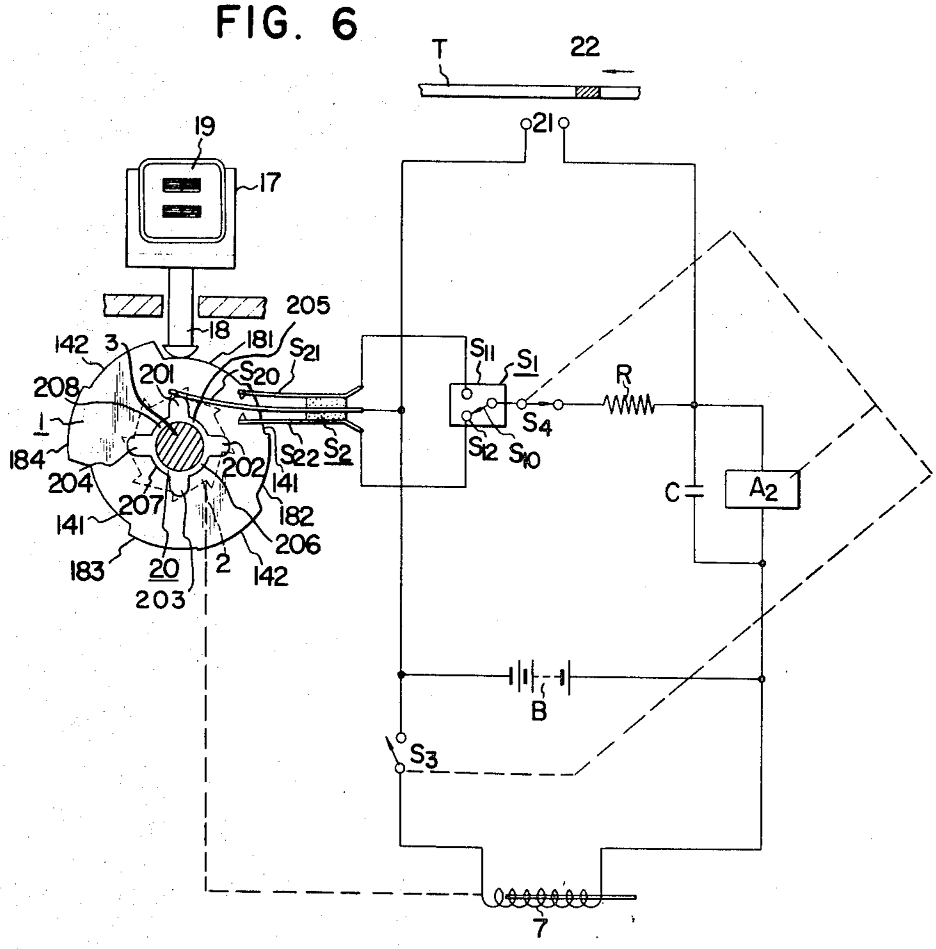
FIG. 6 is a combination of an elevational view indicating the relationship between the cam and magnetic head and an electrical circuit diagram for operating the mechanism illustrated in FIGS. 3, 4, and 5.
Figures 9A, 9B, 9C:
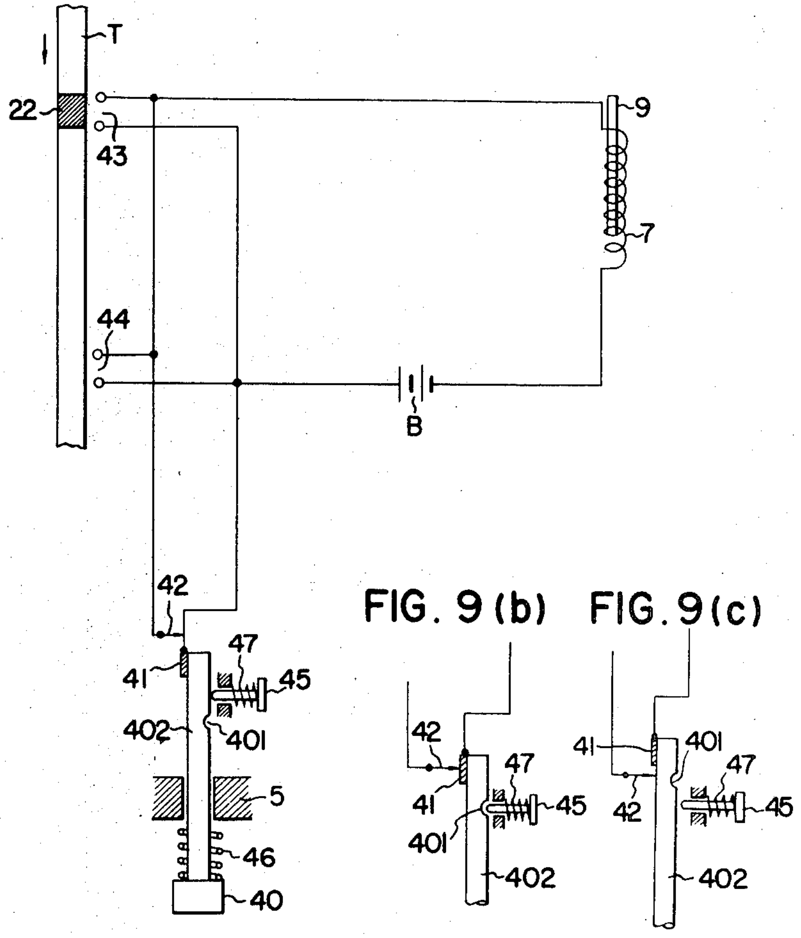

FIG. 9(*a*) is a schematic electrical circuit diagram showing one embodiment of the invention in the case where the invention is applied, not to a fully automatic system as illustrated by the circuit shown in FIG. 6, but to a simple device whereby the apparatus may also be operated manually; and FIGS. 9(*b*) and 9(*c*) are schematic explanatory views indicating the operation of a pushbutton switch in the circuit shown in FIG. 9(*a*).

Figure 1:
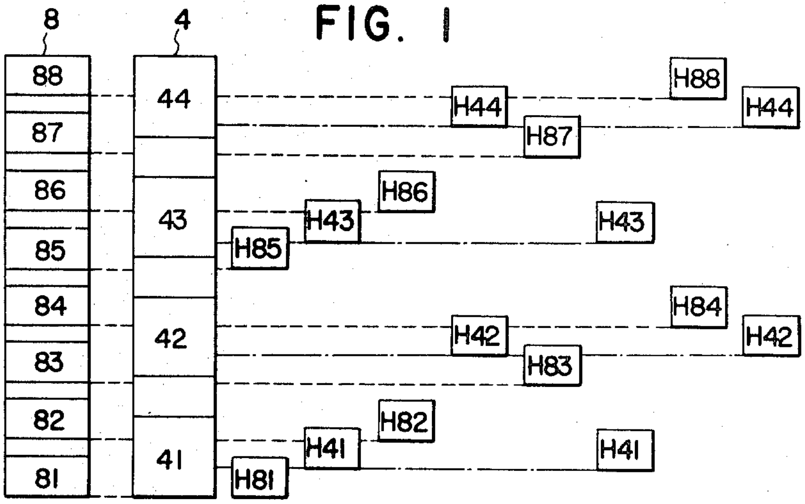
FIG. 1 is a positional diagram indicating positions of a magnetic head of a magnetic sound recording-reproducing apparatus with respect to 8 tracks and 4 tracks.

Referring first to FIG. 1, reference numeral 8 represents a sound recording tape having recording zones 81, 82, 83, 84, 85, 86, 87, and 88, i.e. 8 tracks, and reference numeral 4 represents a sound recording tape having recording zones 41, 42, 43, and 44, i.e. 4 tracks. The relationships of interchanging of the 8-track and 4-track tapes and the changing over of tracks within each tape are as indicated in FIG. 1 and as described below.

When, for example, after the recorded sounds of zones 81 and 85 of an 8-track tape have been reproduced by means of stereophonic head H81, H85, and the cartridge is removed and replaced by a 4-track cartridge, in order to reproduce stereophonically the sounds of recording zones 41 and 43 of the 4-track tape, the positions of the stereophonic heads H81, H85 must be raised to the positions of stereophonic head H41, H43. As another example, when, after the sounds of recording zones 42 and 44 of a 4-track tape have been reproduced by a corresponding stereophonic head, and the sounds of recording zones 83 and 87 of an 8-track tape are to be reproduced, the positions of stereophonic head H42, H44 must be lowered to the positions H83 and H87.

That is, in order to interchange cartridges respectively having 8-track and 4-track tapes and use these cartridges for stereophonic reproduction, it is necessary to raise or lower the positions of the stereophonic head in accordance with the positions of the respective tracks as indicated in the diagram of FIG. 1.

Figure 2:
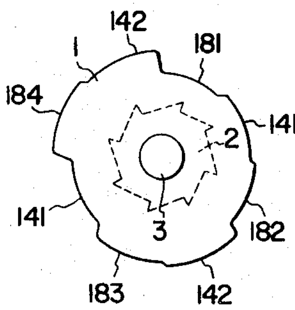
FIG. 2 is an enlarged planer view of a cam for head position adjustment suitable for use in the device according to the invention.

The shifting of the stereophonic head is accomplished by a changeover mechanism according to the invention of the following description. Referring to FIG. 2 showing a driving cam for adjusting the positions of the above mentioned stereophonic head, the cam comprises a cam plate 1 fixed integrally to a ratchet wheel 2 and fixed to and supported by a shaft 3.

The cam plate 1 has peripheral cam faces 181, 182, 183, and 184 respectively for the reproduction of the sounds of first stereophonic recording zones 81 and 85, second stereophonic recording zones 82 and 86, third stereophonic recording zones 83 and 87, and fourth stereophonic recording zones 84 and 88 of an 8-track tape. The cam plate 1 further has two peripheral cam faces 142, 142. The cam faces 141 and 142 are respectively for the reproduction of the sounds of first stereophonic recording zones 41 and 43 and second stereophonic recording zones 42 and 44 of a 4-track tape.

The cam faces are so arranged in contiguous order that the cam faces for 8-track tape and the cam faces for 4-track tape are mutually interposed in alternate arrangement as shown FIG. 2. Therefore, as described hereinafter, selection of the number of tracks in the interchanging of cartridges becomes possible by turning the ratchet wheel 1 through angle corresponding to only one tooth. Accordingly, the mechanical operation and construction of the device can be greatly simplified.

Figure 5:
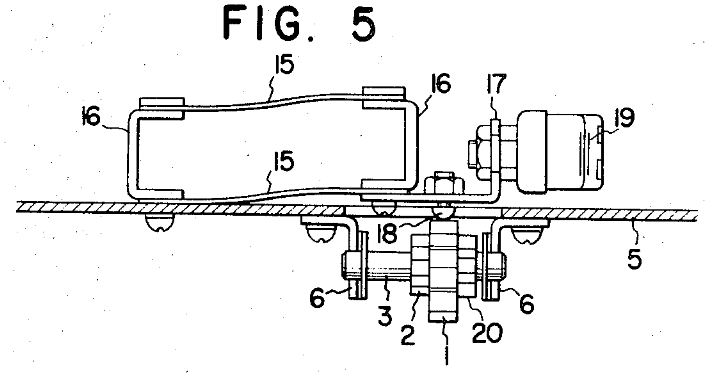
FIG. 5 is an elevational view, partly in section, as viewed in the plane indicated by line V—V in the direction of the arrows, showing a mechanism for adjusting the position of the above mentioned magnetic head by means of the cam shown in FIGS. 2, 3, and 4.

The ratchet wheel 2, which receives driving power for rotating the cam plate 1, has 8 ratchet teeth and is turned through an angle corresponding to two teeth for interchanging between tracks within an 8-track or 4-track tape and through an angle corresponding to one tooth for interchanging of an 8-track tape and a 4-track tape as, for example, changing over from heads H81 and H85 to heads H41 and H43. The shaft 3 is passed through and fixed to the cam plate 1 and ratchet wheel 2 and is rotatably supported in a horizontal position by brackets 6, 6 fixed to a base plate 5 as shown in FIG. 5.

Figure 3:
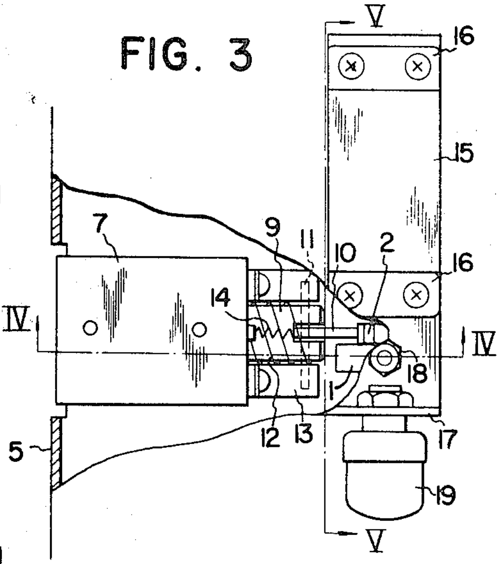
FIG. 3 is a top plan view, with parts cut away, showing the relationship between the device of the invention and the magnetic head.
Figure 4:
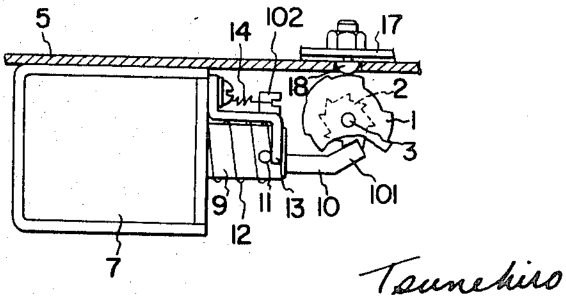
FIG. 4 is a side elevational view, partly in section, as viewed in the plane indicated by the line IV—IV in FIG. 3 and taken in the direction of the arrows, showing the relationship between the cam and a plunger which drives this cam.

The ratchet wheel 2 is actuated by a driving device comprising, as shown in FIGS. 3 and 4, an electromagnet or solenoid 7, whose outer casing is secured to the base plate 5, a plunger bar 9 adapted to be attracted and retracted (toward the left as viewed in FIGS. 3 and 4) into the solenoid coil when this coil is energised, a detent lever 10 in the form of an L-shaped crank-lever pivoted by a pin 11 on the outer end of the plunger bar 9 and having a pawl end 101 for engaging with and driving the ratchet wheel 2, a coil spring 12 disposed around the plunger bar 9 to be compressed when the bar 9 is attracted and to return the bar 9 when its attraction is terminated, and a stopping bracket 13 fixed to the end wall of the solenoid 7 to restrict the outward (rightward as viewed in FIGS. 3 and 4) movement of the extended ends of the pin 11 thereby to restrict the return stroke of the plunger bar 9. The other end 102 of the detent lever 10 is provided with a spring 14 whereby the detent lever 10 is returned to its original position when the attracting force on the plunger bar 9 stops.

The cam action of the above described cam plate 1 is transmitted by the mechanism described below to vary the vertical position of a stereophonic sound recording or reproducing head 19.

The head 19 is fixedly mounted on the central part of the upright flange of a head support bracket 17 having an angle shape, the other flange of which is substantially horizontal and fixedly supports a downwardly directed cam follower 18 in contact engagement with the peripheral cam faces of the cam plate 1. The end edge part of the horizontal flange of the bracket 17 is fixed to the free end of a spring support device fixed at its other end to the base plate 5.

This spring support device comprises upper and lower leaf springs 15, 15 made of an elastic spring material such as Phosphor bronze and channel-shaped members 16, 16 interposed between the end parts of the leaf springs 15, 15 and disposed with their open sides facing each other. Thus, the spring support device partially supports the bracket 17, the magnetic head 19, and the cam follower 18 and also prevents horizontal movements of these parts.

Furthermore, the spring support device is adapted to impart an elastic downward force to these parts, whereby the cam follower is constantly held in contact with the upper periphery of the cam plate 1. Therefore, when the cam plate 1 rotates, the cam follower 18 is moved up and down in a substantially vertical path by the cam faces of the cam plate 1. Thus the support bracket 17 and magnetic head 19 are pushed upward, counter to the force of the leaf springs 15, 15, and downward, aided by the force of these leaf springs.

As shown in FIGS. 5 and 6, a switching cam 20 is provided coaxially and integrally with the cam plate 1 on the side thereof opposite from the side of the ratchet wheel 2. The fixed angular relationship of the cam plate 1, switching cam 20, and ratchet wheel 2 is shown in FIG. 6. More specifically, a lobe 201 on the switching cam 20 is disposed in an angular position corresponding to the cam surface 181 of the cam plate 1, and other lobes 202, 203, and 204 of the switching cam 20 are successively arranged in clockwise order from the lobe 201 at an angular spacing of 90 degrees. The ratchet wheel 2 has 8 ratchet teeth as mentioned hereinbefore.

The switching cam 20 is adapted to actuate a changeover switch $S_2$ disposed relative thereto as shown in FIG. 6, the movable contactor $S_{20}$ of the switch $S_2$ always being in contact with the switching cam 20. The switch $S_2$ has stationary contacts $S_{21}$ and $S_{22}$ and is connected in cascade arrangement with a cartridge selection switch $S_1$ for use when a cartridge for 4-track tape or for 8-track tape is to be interchanged. The switch $S_1$ has a moving contactor $S_{10}$ and stationary contacts $S_{11}$ and $S_{12}$. The contacts $S_{21}$ and $S_{11}$ are connected for, for example, 4-track tape, and contacts $S_{22}$ and $S_{12}$ are connected for 8-track tape.

When the movable contactor $S_{20}$ is raised by any of lobes 201, 202, 203, and 204 of the switching cam 20, it contacts the contact $S_{21}$ and forms an electrical circuit suitable for an 8-track tape. On the other hand, when the contactor $S_{20}$ is in contact with any of the recessed depressions 205, 206, 207, and 208 of the switching cam 20, it contacts the contact $S_{22}$ and forms an electrical circuit suitable for a 4-track tape.

In synchronism with this operation, the aforedescribed electromagnet or solenoid 7, connected as shown in FIG. 6, operates to rotate the ratchet wheel 2 through an angle corresponding to one tooth. Accordingly, if the positions indicated in FIG. 6 are taken to be those for 4-track operation, the movable contactor $S_{20}$ will be caused by the advance of one tooth of the ratchet wheel 2 to contact the depression 208 of the switching cam 20, thereby separating from the contact $S_{21}$ and contacting contact $S_{22}$, whereby switching to 8-track operation will be accomplished.

The circuit is further provided with contact poles 21. When an end mark 22 of a tape T contacts these contact poles 21, the circuit is closed, and a capacitor C is immediately charged by the power source B. Simultaneously, a control relay $A_2$ for controlling the solenoid 7 operates to close its contact $S_3$ and open its contact $S_4$.

Figure 7A:
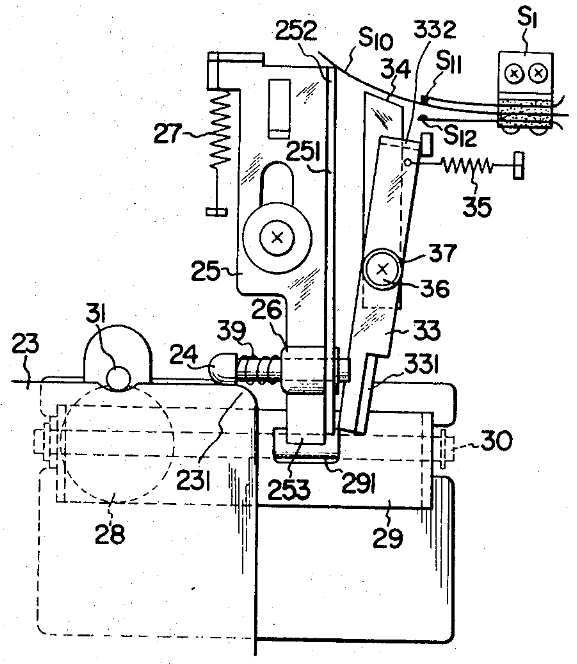
FIG. 7(*a*) is a plan view showing a selection mechanism and its lock mechanism in the case when a magnetic recorder having the cam mechanism and operating circuit illustrated in FIG. 6 is loaded with a cartridge having an endless 4-track tape on which sound has been recorded.
Figure 7C:
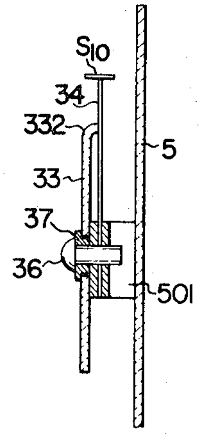
Figure 7B:
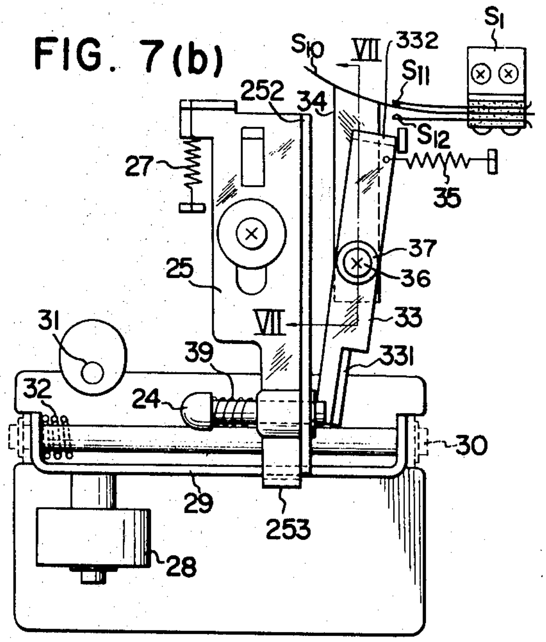

The interchanging of cartridges will now be described. FIG. 7(*a*) illustrates the state wherein a 4-track cartridge is loaded in the magnetic sound recorder. During the procedure of loading the cartridge 23, its corner 231 first contacts a sensing rod 24.

The sensing rod 24 is supported in and by a bushing 26 fixed to a suitable part of a side flange 251 of a slide plate 25, which is slidably suported on the base plate 5 of the magnetic sound recorder so as to be slidable horizontally toward and away from the position of the cartridge. The slide plate 25 is constantly urged toward the cartridge position by a return spring 27. The sensing rod 24 can be caused to slide in the bushing 26 when necessary and is constantly urged toward its projected position (leftward as viewed in FIGS. 7(*a*), 7(*b*), and 8(*a*)) by a spring 39.

The end 253 of the slide plate 25 nearest the cartridge position is engaged in a rectangular opening 291 in a support frame 29 for a pinch roller 28, the frame 29 being free to swing about a horizontal shaft 30.

As the cartridge 23 is further inserted after its corner 231 contacts the sensing rod 24, the sensing rod 24 is pressed, and the slide plate 25 is caused to slide away from the cartridge against the force of the return spring 27, whereupon a corner 252 of the slide plate 25 pushes against the movable contactor $S_{10}$ of the aforementioned selection switch $S_1$ and changes the position of the contactor $S_{10}$ from contact with contact $S_{12}$ to contact with contact $S_{11}$. Simultaneously, the end 253 of the slide plate 25 causes the support frame 29 to rotate approximately 90 degrees about the shaft 30 thereby to cause the pinch roller 28 to swing upright into a position of contact with a capstan 31.

When the movable contactor $S_{10}$ is thus placed in contact with contact $S_{11}$, a circuit consisting of the contactor $S_{10}$, contact $S_{11}$, contact $S_{21}$, contactor $S_{20}$, power source B, capacitor C, control relay A2, resistor R, and contact $S_4$ is formed, whereby the capacitor C is charged, and the relay A2 operates to close its contact $S_3$ and simultaneously to open its contact $S_4$. Consequently, the solenoid 7 immediately operates to retract the plunger bar 9, whereby the detent lever 10 coupled to the bar 9 rotates the ratchet wheel 2 by one tooth.

As a result, the cam plate 1 rotates to move the cam face 181 away from the cam follower 18 and to bring the cam face 141 into contact with the cam follower 18. The switching cam 20 also rotates through an angle corresponding to one tooth of the ratchet wheel 2, and the movable contactor $S_{20}$ is placed in contact with a depression 205 of the switching cam 20 and thereby placed in electrical contact with the contact $S_{22}$. The above mentioned circuit is thereby opened, and current no longer flows to the capacitor C and relay A2.

However, discharging of the capacitor C occurs, and when the terminal voltage decreases to a value below the holding voltage of the relay A2, the relay A2 assumes its "OFF" state, the contacts $S_3$ and $S_4$ thereof respectively opening and closing. Consequently, the solenoid 7 is deenergized.

As a result of the above described operation, the cam face of the cam plate 1 in contact with the cam follower 18 is changed from face 181 to face 141, whereby the magnetic head position is adjusted to the position of H41, H43 as shown in FIG. 1 to reproduce the sounds recorded on tracks 41 and 43.

When the cartridge 23 is removed, the support frame 29 is caused to rotate in the reverse direction by a return spring 32 provided on the shaft 30, and the pinch roller 28 is swung to the position indicated in FIG. 7(*b*). Simultaneously, the slide plate is pulled back to the position shown in FIG. 7(*b*) by its return spring 27, and its corner 252 separates from the moving contactor $S_{10}$ of the selection switch $S_1$.

When the movable contactor $S_{10}$ is thus released by the corner 252 of the slide plate 25, it again moves toward its position of contact with the contact $S_{12}$, and operation with a 4-track cartridge would become impossible unless the contactor $S_{10}$ could be locked. Accordingly, it is necessary to provide means whereby the contactor $S_{10}$ can be maintained in contact with the contact $S_{11}$ even when the corner 252 separates from the contactor $S_{10}$.

The present invention fulfills this requirement by providing a locking mechanism comprising, essentially, a lock spring 34, an unlocking lever 33, and return spring 35. This locking mechanism is mounted by means of a screw 36 and a bushing 37 on a bracket part 501 of the base plate 5 as shown in FIG. 7(*c*). The unlocking lever 33 is rotatably pivoted at the screw 36 and bushing 37 and is provided at one end thereof with an upwardly bent flange 331 and at the other end 332 with a downwardly bent flange of progressively varying width in contact with the lock spring 34.

The lock spring 34 is in the form of a cantilever beam fixed at one end to the bracket 501 and having a free end which, unless acted upon by the unlocking lever 33, is in a position to be contacted by the released contactor $S_{10}$ as shown in FIG. 7(*c*) thereby to lock the contactor $S_{10}$. The lock spring 34 is caused to bend downwardly as shown in FIG. 8(*b*) by the bent flange of the unlocking lever 33 when this lever is rotated counterclockwise (as viewed in FIG. 7(*b*)), the bent flange of varying width of the lever 33 acting as a sliding inclined plane, thereby releasing the contactor $S_{10}$.

The operation of the above described device will now be described with respect to the case when, with the selection switch actuating and locking mechanisms in the state indicated in FIG. 7(*b*), an 8-track cartridge is loaded, it being assumed that the cam plate 1 is in a position at which its face 141 is in contact with the cam follower 18.

Figure 8A:
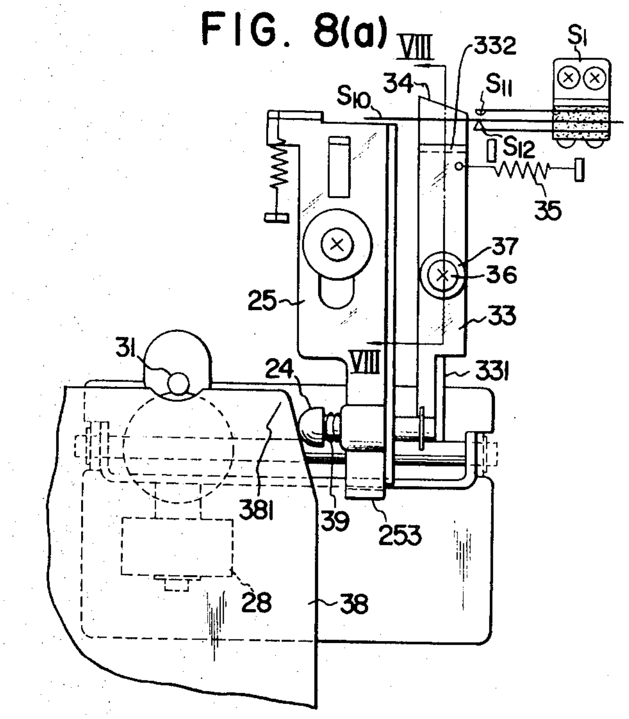
FIG. 8(*a*) is a plan view showing the above mentioned selection mechanism and lock mechanism in the case when the magnetic recorder is loaded with a cartridge for an 8-track tape.
Figure 8:
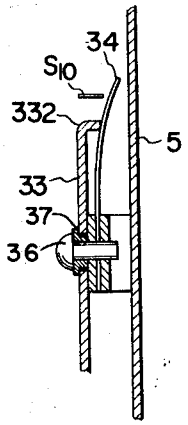

As shown in FIG. 8(*a*), the corner 381 of an 8-track cartridge 38 in use heretofore is in the shape of a rectangle with a beveled portion. Accordingly, when the cartridge 38 is inserted, the sensing rod 24 is caused to slide and retract against the force of the return spring 39 thereby pushing against the flange 331 of the unlocking lever 33 and causing this lever 33 to rotate in the counterclockwise direction as viewed in FIG. 8(*a*) against the force of the return spring 35. Consequently, the lock spring is caused to release the contactor $S_{10}$ as described above.

Since the sensing rod 24 during this operation slides perpendicularly to the direction of movement of the slide plate 25, the slide plate 25 does not slide, and, therefore, the contactor $S_{10}$ is not actuated but contacts the contact $S_{12}$ to establish the circuit for 8-track reproduction, that is, there is formed a circuit comprising the movable contactor $S_{10}$, contact $S_{12}$, contact $S_{22}$, movable contactor $S_{20}$, power source B, relay A2, capacitor C, resistor R, and contact $S_4$, whereby the capacitor C is charged, and the relay A2 operates.

Thereafter, by an operation similar to that described above, the cam plate 1 is rotated, and the cam follower 18 is placed in contact with cam face 182, whereby the magnetic head 19 is adjusted to the 8-track position, that is, to the position of H82 and H86.

When the cartridge 38 is extracted, the sensing rod 24 is returned to its original position by its return spring 39, and the unlocking lever 33 is rotated in the reverse (clockwise) direction and returned to its initial angular position by its return spring 35.

Switching between the various tracks is accomplished in the following manner. When the end mark 22 on a traveling tape T contacts the contact poles 21, the circuit as shown in FIG. 6 is closed, whereby the capacitor C is immediately charged, and the control relay A2 operates, closing its contact $S_3$ and opening its contact $S_4$. Consequently, the solenoid 7 operates to retract the plunger bar 9, and the detent lever 10 is placed in a state for rotating the ratchet wheel 2 by one tooth.

When the tape end mark 22 passes by the contact poles 21, the circuit is opened, but the capacitor C discharges, and when its terminal voltage decreases to a value below the holding voltage of the relay A2, the relay A2 assumes its "OFF" state whereby its contact $S_3$ is opened (simultaneously, contact $S_4$ is closed). Consequently, the exciting current for the solenoid 7 is cut off, and the plunger bar 9 is returned to its original position by the return spring 12.

As a result, the ratchet wheel 2 is rotated by one tooth, and the movable contactor $S_{20}$ of the changeover switch $S_2$ is placed in contact with a depression in the switching cam 20 and contacts the contact $S_{22}$, thereby closing a circuit comprising the contact $S_{22}$, contact $S_{12}$, movable contactor $S_{10}$, contact $S_4$, resistor R, capacitor C, control relay $A_2$, power source B, and movable contactor $S_{20}$. The capacitor C is thereby charged again, and the relay A2 operates to close its contact $S_3$, whereby the solenoid 7 operates. Thereafter, the same operation as described above is carried out, whereby the ratchet wheel 2 is rotated again by one tooth.

As a result, the cam plate 1 is caused to undergo two changes of contact between its periphery and the cam follower 18 for vertical actuation of the magnetic head. It is thereby possible to adjust the position of the magnetic head with respect to the loaded cartridge. The resistor R is inserted in the circuit formed in the above described manner for the purpose, in this case, of reducing the current flowing through circuit and prolonging the time for charging the capacitor C thereby to eliminate misoperation in the advancement operation of the ratchet wheel 2 due to actuation by the solenoid 7.

While the invention has been described above with respect to an example of a device operating in a fully automatic manner, the invention will now be described with respect to a preferred embodiment thereof in the form of a simplified device as illustrated in FIGS. 9(*a*), 9(*b*), and 9(*c*).

As shown in FIG. 9(*a*), the circuit for supplying energizing current to the solenoid 7 includes two spaced apart parallel pairs of contact poles 43 and 44, either of which can close the circuit when contacted by the end mark 22 of a tape T traveling through the apparatus in the direction of the arrow. Connected in parallel with these contact poles 43 and 44, there is further provided a push-button switch device comprising a push button 40 fixed to a push bar 402 which is slidably supported by a side plate of the base plate 5, a contact 41 provided at the end of the push bar 402 remote from the head of the push button 40, a sliding contact 42 for contacting the contact 41, and a click stop pin 45 slidably supported by a part of the base plate 5 for engagement with a notch 401 provided in the push bar 402. The push button 40 and click stop pin 45 are respectively provided with return springs 46 and 47.

The solenoid 7 provided with the plunger bar 9 is the same as that described hereinbefore with reference to FIGS. 3 and 4 for constituting the actuating part of a magnetic head adjusting mechanism.

The magnetic sound recording-reproducing apparatus provided with the device illustrated in FIG. 9 operates in the following manner. It will be first assumed that, in the case when the apparatus is loaded with a cartridge containing an 8-track tape, stereophonic reproduction is to be carried out from recording zones 81 and 85 and then from recording zones 82 and 86.

When the end mark 22 on the traveling tap T contacts the contact poles 43, the above described circuit is closed, whereby a current is supplied to the solenoid 7, and the plunger bar 9 is retracted. Accordingly, the ratchet wheel 2 is rotated by one tooth by the detent lever 10 provided on the plunger bar 9. As a result, the cam plate 1 rotates to cause the cam follower 18 to transfer from cam face 181 to cam face 141.

However, since the end mark 22 soon contacts the contact poles 44, the circuit is again closed, and the solenoid operates and, in the same manner as before, causes the ratchet wheel 2 to rotate by one tooth. Consequently, the cam follower 18 is caused to contact cam face 182, with the result that the sounds of recording zones 82 and 86 are reproduced. Similarly, the sounds of recording zones 83 and 87 and recording zones 84 and 88 are reproduced.

Then, when the cartridge containing the 8-track tape is extracted, and a cartridge containing a 4-track tape is loaded, the push button 40, as shown in FIG. 9(*a*) is lightly pressed by finger pressure against the force of the spring 46 until the click stop pin 45 clicks into place in the notch 401. The contact 41 is thereupon placed in contact with the sliding contact 42 to close the circuit, whereby the solenoid 7 operates to cause the ratchet wheel 2 to rotate by one tooth.

At this time, the finger pressure which has lightly pressed the push button 40 is released, whereby the push button 40 and push bar 402 are returned to the original position by the return spring 46, and the contact 41 and sliding contact 42 separate, thereby opening the circuit. Accordingly, the solenoid 7 is no longer energized, and the ratchet wheel does not rotate further.

As a result, the cam follower 18 is caused by the previous rotation of the ratchet wheel 2 by one tooth to raise the stereophonic magnetic head 19 from the position H81, H85 to the position H41, H43, whereupon the 4-track tape becomes capable of being reproduced. Then, as the tape T travels, the end mark 22 on the tape successively closes the contact poles 43 and 44 to close the circuit each time. Thus, stereophonic reproduction of recording zones 41, 43 and recording zones 42, 44 is accomplished similarly as in the case of an 8-track tape.

When, while certain tracks are being reproduced stereophonically, it is desired to change over to the succeeding tracks before the end mark of the tape arrives, the push button 40 is pressed strongly by finger pressure as indicated in FIG. 9(*c*) so that the push bar 402 over-rides past the position shown in FIG. 9(*b*), and then the finger pressure is promptly released. The push button 40 and push bar 402 thereupon is caused by the return spring 46 to pass by the position of FIG. 9(*b*) and return immediately to the original position of FIG. 9(*a*). As a net result, the solenoid 7 operates twice to cause the ratchet wheel to rotate through an angle corresponding to two teeth and thereby to accomplish changing over of tracks.

Selection of tracks at will by manual operation is possible also in a circuit of automatic type by providing a push button switch in parallel with the two terminals of the contact poles 21 shown in FIG. 6.

While an electromagnetic relay is used as an illustrative example of the relay A2 in the circuit shown in FIG. 6, it will be obvious that it is also possible to use, instead, a contactless relay in which at least one semiconductor is used.

As described above, the present invention provides, in a magnetic sound recording-reproducing apparatus capable of interchangeably using multi-track stereophonic recording tapes, a device for adjusting the position of the magnetic head whereby tapes having respective numbers of tracks related by a ratio which is an integral number as, for example, an 8-track tape and 4-track tape, can be interchangeably used for sound recording or reproducing.

For interchanging between various tracks and between numbers of tracks in this operation, the present invention provides a device having a simplified form in which the magnetic head for stereophonic sound recording and reproducing can be adjustably shifted to a desired position by lightly pressing a push button to activate a solenoid and thereby actuating a cam mechanism, and in which recording zones from among the tracks of a traveling tape can be selected for stereophonic use by pressing the push button strongly to cause the solenoid to operate twice and thereby actuating the cam device to shift the magnetic head to a desired position.

Furthermore, the invention provides an automatic system comprising a head shifting cam mechanism, a switching cam operating together with the heat shifting cam mechanism, a head driving electrical circuit including a changeover switch actuated by the switching cam, a selection switch capable of accomplishing selection with respect to a cartridge loaded into the apparatus, a capacitor, a solenoid for actuating the cam mechanism, a solenoid control relay, contact poles, a resistor, and a power source, and a locking mechanism for locking the selection switch.

By the use of this automatic system it is possible, by merely inserting a cartridge into loaded position, to cause the magnetic head to be positioned suitably for this cartridge and, moreover, to change over automatically between tracks of each cartridge. Accordingly, it is possible to use in a freely interchangeable manner a cartridge with 8 tracks already recorded or to be recorded and a cartridge with 4 tracks already recorded or to be recorded. At the same time, it is possible to reproduce stereophonically the tape of each cartridge in a simple manner.

In the automatic system, moreover, changing over can be accomplished by the single operation of inserting a cartridge into loaded position, and it is possible to accomplish automatically changing over between tracks of each cartridge, whereby interchanging of cartridges becomes very convenient.

What we claim is:

1. In a magnetic sound recording and reproducing apparatus in which there can be used interchangeably two types of multi-track stereophonic recording tapes each having different numbers of tracks thereon, one having a larger number of tracks and the other having a smaller number of tracks, which tapes are contained in two different types of cartridges, one type of cartridge indicating the larger number of tracks on the tape therein, and the other type of cartridge indicating the smaller number of tracks on the tape therein, a head position adjusting device comprising, in combination: a stereophonic sound recording and reproducing head; movable head holding means supporting said head for movement in a direction transverse to the direction of movement of a recording tape traveling past said head; a cam for positioning and maintaining the head at a position corresponding to the tracks on the recording tape to be moved past said head for recording or reproducing, said cam having a closed geometric shape and a plurality of cam faces equally spaced therearound and equal in number to the number of the tracks on the tape with the larger number of tracks, one half of said cam faces being used for positioning the head opposite the different tracks on tapes having the larger number of tracks and the remaining half of said cam faces being used for positioning the head opposite the different tracks on the other tapes having the smaller number of tracks, and the cam faces of the said one half of said cam faces alternating with the cam faces of said remaining half of said cam faces; a ratchet wheel integral with said cam for rotating said cam and having a number of ratchet teeth equal to the total number of said cam faces; a projection provided on one part of said head supporting means confronting and in contact with said cam faces for transmitting to said head adjusting movement in said transverse direction; driving means engaged with said ratchet wheel for rotating said ratchet wheel through an angle corresponding to one tooth for changing said cam faces acting on said holding means to shift said head from a position to record on or reproduce from the tracks on the tape with one number of tracks to a position to record on or reproduce from the tracks on the tape with the other number of tracks, and for rotating said ratchet wheel through an angle corresponding to two teeth for changing said cam faces acting on said head holding means to shift said head from position to position to record on or reproduce from the various tracks of each tape, respectively; cartridge sensing means for sensing the type of cartridge in said apparatus and coupled to said driving means for causing said driving means to rotate said ratchet wheel through an angle corresponding to one cam face when a different type of cartridge is sensed; and track shifting means coupled to said driving means for causing siad driving means to rotate said ratchet wheel through an angle corresponding to two cam faces when the head is to be shifted from one track to another track on one tape.

2. The head position adjusting device as claimed in claim 1 in which the driving means for rotating the ratchet wheel comprises a solenoid with a plunger bar and a detent lever on the plunger bar and engaged with said ratchet wheel to accomplish detent action on the ratchet wheel to rotate the ratchet wheel through an angle corresponding to one tooth thereof upon actuation of the solenoid.

3. The head position adjusting device as claimed in claim 2 in which said track shifting means comprises solenoid operating means for the selection of tracks, and comprises the combination of a switching cam integral with and rotating together with the ratchet wheel and said cam, a first changeover switch engaging with and operated by the switching cam, and a solenoid controlling electrical circuit including the changeover switch and coupled to said solenoid and being switched by the changeover switch in accordance with the selection of tracks on the recording tape, whereby when the controlling circuit is otherwise complete, exciting current passes through the solenoid to cause the detent lever to rotate the ratchet wheel through an angle corresponding to one tooth.

4. The head position adjusting device as claimed in claim 3, in which the cartridge sensing means comprises a detecting mechanism for detecting the respective types of the cartridges carrying the different tapes and operating in accordance therewith, and said solenoid controlling electrical circuit further comprises a selection switch connected in series with the changeover switch and coupled to said detecting mechanism to be operated thereby for completing the solenoid controlling electrical circuit in accordance with the type of cartridge sensed by said cartridge sensing means.

5. The head position adjusting device as claimed in claim 4 adapted for use with one type of tape cartridge which has a rectangular corner and a second type which has a rectangular corner with a beveled portion, wherein the detecting mechanism comprises a slidable slide plate slidable in one direction by one type of tape cartridge, said slide plate having a return spring connected thereto urging the plate in a direction opposite the direction said slide plate is urged by the tape cartridge; a sensing rod supported slidably in a direction transverse to the cartride inserting direction on one part of the slide plate; the selection switch having a movable contact and a pair of stationary contacts, the movable contact being engaged by said slide plate when it slides; means to lock the movable contact of the selection switch in contact with one of the pair of stationary contacts to maintain a constant operating condition when a particular type of tape cartridge is sensed; and an unlocking means to release the locking means for other operating conditions with other types of tape cartridges, said unlocking means being rotatably pivoted and provided at one end thereof with a transversely bent flange opposed to one end of the sensing rod and at the other end with a transversely bent flange of progressively varying width in contact with the locking means, whereby when the one type of tape cartridge with a rectangular cover is loaded in the recording/reproducing apparatus with said corner toward the detecting means, said corner of the rectangular cartridge contacts the sensing rod to press it forward to cause the slide plate to slide away from the cartridge against the force of the return spring, and simultaneously the slide plate pushes against the movable contactor of the cartridge selection switch to change the position of the contactor, whereby the electrical circuit corresponding to the tracks of the tape in the one type of tape cartridge is closed to rotate the cam, ratchet wheel, and switching cam together to adjust the position of the head for the tracks on the tape in the one type of cartridge; and the locking means holds the movable contact of the selection switch in a locked state even after the slide plate returns to its original position and away from the contactor, even after removal of the one type of tape cartridge; and when the second type of cartridge having a beveled corner is loaded in the recording/reproducing apparatus with the beveled corner toward the detecting means, said corner of the tape cartridge pushes away the sensing rod and causes it to slide in the forwarding direction of the cartridge to rotate the unlocking lever on the pivot to release the movable contactor from its position to another, whereby the electrical circuit corresponding to the tracks of the tape in the second type of cartridge is closed and the cam, ratchet wheel, and switching cam are rotated together to adjust the position of the head for the tracks on the tape in the second type of cartridge.

6. The head position adjusting device as claimed in claim 1 which is adapted for interchangeable use of 8-track stereophonic recording tape and 4-track stereophonic recording tape, and in which, for interchanging of said 8-track and 4-track tapes and for selection of tracks on each tape, the positioning cam is provided with eight cam faces contiguously arranged around the periphery thereof and corresponding respectively to first, second, third, and fourth stereophonic recording zones of an 8-track recording tape and first and second stereophonic recording zones of a 4-track recording tape, the cam faces corresponding to the zones of the 4-track recording tape being interposed between the cam faces corresponding to the zones of the 8-track recording tape in said alternate arrangement.

7. In a magnetic sound recording and reproducing apparatus, in which there can be used interchangeably two types of mutli-track stereophonic recording tapes each having different numbers of tracks thereon, one having a larger number of tracks and the other having a smaller number of tracks, which tapes are contained in two different types of cartridges, one type of cartridge indictaing the larger number of tracks on the tape therein, and the other type of cartridge indicating the smaller number of tracks on the tape therein, a head position adjusting device comprising, in combination: a stereophonic sound recording and reproducing head; movable head holding means supporting said head for movement in a direction transverse to the direction of movement of a recording tape traveling past said head; a cam for positioning and maintaining the head at a position corresponding to the tracks on the recording tape to be moved past said head for recording or reproducing, said cam having a closed geometric shape and a plurality of cam faces equally spaced therearound and equal in number to the number of the tracks on the tape with the larger number of tracks, one half of said cam faces being used for positioning the head opposite the different tracks on tapes having the larger number of tracks and the remaining half of said cam faces being used for positioning the head opposite the different tracks on the other tapes having a smaller number of tracks, and the cam faces of the said one half of said cam faces alternating with the cam faces of said remaining half of said cam faces; a ratchet wheel integral with said cam for rotating said cam and having a number of ratchet teeth equal to the total number of said cam faces; the cam faces engaging said head holding means to move the head in said transverse direction to position it opposite the desired tracks from among the tracks of each tape; a switching cam integral with and rotating together with the ratchet wheel; driving means for driving the ratchet wheel comprising a solenoid, a plunger bar reciprocated by said solenoid, and a detent lever on said plunger bar actuated by the plunger bar and engaging with and rotating the ratchet wheel; a changeover switch engaged with the switching cam; a selection mechanism for detecting the respective types of cartridge containing recording tapes and operating in accordance therewith; a selection switch connected in series with the changeover switch and operated by the selection mechanism; relay means connected to the selection switch and changeover switch for controlling the solenoid; and spaced contact poles connected in series with said relay means which are bridged and closed when contacted by an end mark provided on each recording tape, the relay means being coupled to the selection switch and the changeover switch to control the solenoid and cause the ratchet wheel to rotate by one tooth upon changing the type of cartridge, and to further cause the ratchet wheel to rotate by two teeth upon the end mark bridging the contact poles and thus changing the tracks on a tape.

8. The head position adjusting device as claimed in claim 7 in which the selection mechanism comprises a slide plate caused to slide by the loading action of a cartridge of one type into engagement with the selection switch, a lock spring for holding the selection switch in a locked state during and after extraction of said cartridge, a sensing rod actuated by the loading action of a cartridge of another type, and an unlocking lever engaged by and operated by the sensing rod to press against the lock spring in a manner to unlock and release the selection switch held in a locked state.

9. The head position adjusting device as claimed in claim 7 further comprising a manually operated switch connected in parallel with the contact poles which are closed by the end mark on each recording tape.

10. In a magnetic sound recording and reproducing apparatus, in which there can be used interchangeably two types of multi-track stereophonic recording tapes each having different numbers of tracks thereon, one having a larger number of tracks and the other having a smaller number of tracks, which tapes are contained in two different types of cartridges, one type of cartridge indicating the larger number of tracks on the tape therein, and the other type of cartridge indicating the smaller number of tracks on the tape therein, a head position adjusting device comprising, in combination: a stereophonic sound recording and reproducing head; movable holding means supporting said head for movement in a direction transverse to the direction of movement of a recording tape traveling past said head; a cam for positioning and maintaining the head at a position corresponding to the tracks on the recording tape to be moved past said head for recording or reproducing, said cam having a closed geometric shape and a plurality of cam faces equally spaced therearound and equal in number to the number of the tracks on the tape with the large number of tracks, one half of said cam faces being used for positioning the head opposite the different tracks on tapes having the larger number of tracks and the remaining half of said cam faces being used for positioning the head opposite the different tracks on the other tapes having a smaller number of tracks, and the cam faces of the said one half of said cam faces alternating with the cam faces of said remaining half of said cam faces; a ratchet wheel integral with said cam for rotating said cam and having a number of ratchet teeth equal to the total number of said cam faces; said cam being engaged with said holding means to change the position of the head in order to select the appropriate tracks; a detent lever engaging with teeth of the ratchet wheel; a plunger carrying the detent lever; a solenoid actuating the plunger, a push-button switch connected in series with the solenoid to activate the solenoid and rotate the ratchet wheel by one tooth so that when the type of cartridge is changed the head can thus be moved to be opposite a track in the new cartridge; and two pairs of contact poles which are mutually disposed at an appropriate interval along the travelling direction of the recording tape and electrically connected in parallel to each other and to said pushbutton switch, and each in series with said solenoid and closeable upon contact with an electro-conductive end mark provided on the recording tape, the end mark contacting the two pairs of contact poles one after the other at the completion of reproduction on one stereoeophonic sound track in the recording tape, thereby closing the contact poles to render the solenoid conductive two times for rotation of the ratchet wheel by two teeth for changing the cam face to shift the head support means to appropriate positions for the tracks on the tapes.

11. The device as claimed in claim 10 wherein said pushbutton is a manually operated pushbutton having a push bar and a return spring to return the pushbutton to its original position as soon as it is released, the push bar being provided with a notch and a contact; a stop pin engaged with the notch upon the botton being pushed; and a sliding contact separately provided and contacted with the contact on the push bar, the sliding contact and the contact on the push bar being connected in parallel with the contact poles and being contacted when the notch and the stop pin are in engagement, whereby the solenoid for driving the plunger is energized.

References Cited

UNITED STATES PATENTS

| | | | |
|---|---|---|---|
| 2,468,198 | 4/1949 | Heller | 179—100.2 |
| 2,857,164 | 10/1958 | Camras | 274—4 |
| 2,328,539 | 9/1943 | Greenleaf et al. | 179—100.2 |
| 3,388,911 | 6/1968 | Wilson et al. | 274—4 |
| 2,730,581 | 1/1956 | Bruno. | |
| 3,437,762 | 4/1969 | Lear et al. | |

LEONARD FORMAN, Primary Examiner

S. L. STEPHAN, Assistant Examiner

U.S. Cl. X.R.

179—100.2